United States Patent
Martin et al.

(10) Patent No.: US 7,066,715 B2
(45) Date of Patent: *Jun. 27, 2006

(54) TURBINE EFFICIENCY TAILORING

(75) Inventors: Steven P. Martin, Walnut, CA (US); Glenn F. Thompson, Palos Verdes Estates, CA (US); Scott G. Aguilar, La Crescenta, CA (US)

(73) Assignee: Honeywell International, Inc., Morristown, NJ (US)

( * ) Notice: Subject to any disclaimer, the term of this patent is extended or adjusted under 35 U.S.C. 154(b) by 33 days.

This patent is subject to a terminal disclaimer.

(21) Appl. No.: 10/871,396

(22) Filed: Jun. 18, 2004

(65) Prior Publication Data

US 2004/0234373 A1    Nov. 25, 2004

Related U.S. Application Data

(63) Continuation of application No. 10/269,432, filed on Oct. 11, 2002, now Pat. No. 6,767,185.

(51) Int. Cl.
   *F01D 25/24* (2006.01)
(52) U.S. Cl. ............................ 415/203; 415/204
(58) Field of Classification Search ............ 415/203, 415/204
   See application file for complete search history.

(56) References Cited

U.S. PATENT DOCUMENTS

| 1,608,547 A | 11/1926 | Clark |
| 3,010,697 A | 11/1961 | Lazo et al. |
| 3,144,913 A | 8/1964 | Bailey |
| 3,652,176 A | 3/1972 | Walsh |
| 3,781,126 A | 12/1973 | Benisck |
| 4,181,466 A | 1/1980 | Owen |
| 4,445,337 A | 5/1984 | McCreary |
| 4,676,717 A | 6/1987 | Willyard, Jr. et al. |
| 4,927,325 A * | 5/1990 | Yano ............... 415/161 |
| 5,076,758 A | 12/1991 | Palgrave |
| 5,441,383 A | 8/1995 | Dale et al. |
| 5,584,181 A | 12/1996 | Jinnouchi |
| 5,618,162 A | 4/1997 | Chan et al. |
| 6,202,413 B1 | 3/2001 | Baker et al. |
| 6,224,321 B1 | 5/2001 | Ebden et al. |
| 6,263,672 B1 * | 7/2001 | Roby et al. ............. 60/605.2 |
| 6,308,517 B1 | 10/2001 | Fausten et al. |
| 6,324,847 B1 | 12/2001 | Pierpont |
| 6,767,185 B1 * | 7/2004 | Martin et al. ............. 415/205 |
| 2001/0032465 A1 | 10/2001 | Terry et al. |
| 2001/0035171 A1 | 11/2001 | Kim et al. |

FOREIGN PATENT DOCUMENTS

| DE | 4411678 | 10/1995 |
| DE | 10121390 | 11/2002 |

* cited by examiner

*Primary Examiner*—Ninh H. Nguyen
(74) *Attorney, Agent, or Firm*—Chris James (57) ABSTRACT

A turbomachinery apparatus. A turbine is provided with a retainer having a bore step element for turbine wheel retention, and with an aperture manifesting a tailored diameter less than the trim diameter of the turbine, thereby to permit customization of the turbine efficiency characteristic. Various configurations of turbine retainers, with tailored diameter apertures, are disclosed.

11 Claims, 11 Drawing Sheets

TURBINE EFFICIENCY TAILORING

RELATED APPLICATION

This application is a continuation of application Ser. No. 10/269,432, filed Oct. 11, 2002, now U.S. Pat. No. 6,767,185, entitled "Turbine Efficiency Tailoring", to Martin and of common assignee, which is incorporated by reference herein.

BACKGROUND OF THE INVENTION

1. Field of the Invention (Technical Field)

The present invention relates generally to turbomachinery, particularly turbocharged internal combustion engines, and specifically relates to a turbine housing for improving the turbine efficiency characteristic.

2. Background Art

It is known in the general art of internal combustion engines to provide some system of turbocharging, whereby a turbine harnesses energy from exhaust gases to power a compressor. The compressor is then used to increase engine performance, typically by boosting the pressure of air supplied to the engine.

Nearly as important as engine performance is the need for cleaner exhausts. Most internal combustion engines are subject to regulations governing pollutant levels in engine emissions. "Stationary sources" such as internal combustion engine powered generators and the like, as well as motor vehicles, are required to maintain emissions of certain pollutants, such as CO and $NO_x$, below legal limits. Pollution control, however, ideally is accomplished while compromising engine performance as little as possible.

One mode of reducing the emissions of internal combustion engines—regardless of whether the engine is turbocharged, but frequently when it is—is through exhaust gas recirculation (EGR). EGR involves the return to the engine's intake manifold of some portion of the engine exhaust. Exhaust gases are diverted from the exhaust manifold through a duct or conduit for delivery to the intake manifold, thereby allowing exhaust to be introduced to the combustion cycle, so that oxygen content is reduced, which in turn reduces the high combustion temperature that contributes to excessive $NO_x$ formation.

With the introduction of EGR systems on, for example, heavy-duty diesel engines, the desired turbine efficiency characteristic does not conform to conventional turbomachinery performance. Simply accepting classical turbomachinery turbine efficiency characteristic when using applicants' VNT™ brand of variable nozzle turbine turbocharger EGR System causes several effects, including: (1) Unacceptably high fuel consumption at certain engine operating speeds; (2) Unacceptably high turbocharger speed (i.e., turbocharger speeds which exceed acceptable limits using known production materials and processes); and (3) An inability to drive the EGR at all desires engine operating points.

Further, with the use of EGR systems in use on a heavy-duty diesel engine, the turbocharger "match" to the engine results in unusual turbocharger turbine wheel matching. In some instances, for example, the traditional or conventional wheel contour is removed from the design. This unusual machining of the turbine wheel may result in an increased difficulty in retaining the turbine wheel in the event the turbine wheel separates from the turbocharger shaft. In such an event, the turbine wheel will exit the turbine housing gas outlet at a substantially higher velocity and energy than in a similar circumstance with current turbocharger assembly designs.

Against the foregoing background, the present invention was developed. The turbine housing is modified to retain the wheel and to tailor the turbocharger turbine efficiency, thus addressing the deficiencies noted above. The scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate two embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention relates to turbines, particularly but not necessarily turbines used in turbocharged engines. The apparatus of the invention may find beneficial use in connection with Exhaust Gas Recirculation (EGR) systems used with diesel-fueled power plants, including but not limited to the engines of large motor vehicles. By modifying according to this invention the turbine wheel retainment design, the turbine efficiency characteristic can be tailored to meet specialized needs, and turbine wheel retention is promoted. Accordingly, the present invention ameliorates wheel retention and turbine efficiency characteristic problems attributable to the use of EGR systems in conjunction with turbines. The problems are addressed with inventive modification of the turbine housing. The present invention, as further characterized and disclosed hereafter, includes such modifications.

As known in the art, a turbine work is directly proportional to turbine efficiency, mass flow, ratio of pressure across the turbine and inlet temperature. Shaft, or rotor speed is the product of turbine work applied to a directly driven compressor. VNT turbine rotor speed can be altered by tailoring the turbine's efficiency at the turbine wheel exit via the exit configuration shape and size. The impact of the change in efficiency is used to match compressor and VNT characteristics to meet engine air system requirements. The sizing of the exit feature may be limited by resulting engine performance parameters in addition to turbomachinery speed control, i.e., fuel consumption or possibly engine pressure ratios.

By defining a shaped and sized step-bore in the turbine housing, at the turbine wheel exit, the turbine efficiency characteristic can be selectively tailored to improve turbine efficiency behavior, thereby enhancing VNT turbocharger EGR systems performance. Succinctly stated, the provision of a step-bore reduces the turbine efficiency, resulting in a favorable increase in turbine inlet pressure. The increased inlet pressure promotes the flow of exhaust gas from the engine's exhaust manifold into the engine's intake manifold. This beneficial turbocharger behavior is accomplished, according to the invention, at a reduced turbocharger speed than would be attainable with a typical turbomachinery turbine efficiency characteristic. Despite the comparatively reduced turbocharger speed, performance is not compromised; so the inventive apparatus may be fashioned from currently existing production materials, and known processes for VNT turbocharger systems are applicable. Furthermore, lowered turbine efficiency provides the capacity to drive a larger quantity of EGR flow into the engine intake manifold than would be possible with conventional turbine housing designs.

Figures 1, 2A, 2B:
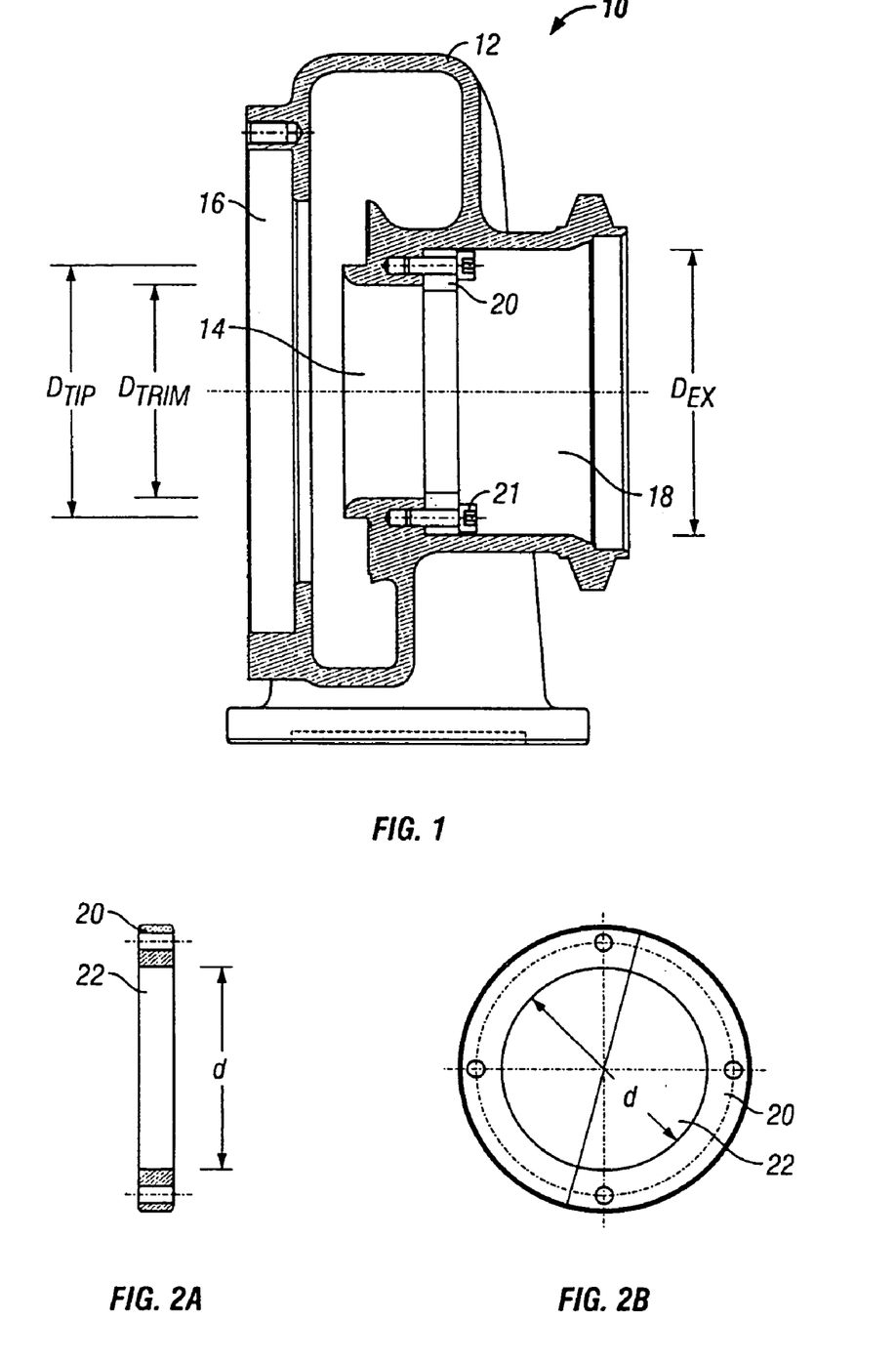
FIG. 1 is a side (axial) sectional view of one embodiment of the turbine apparatus according to the present invention.
FIG. 2A is a side (axial) sectional view of a retainer ring element of the apparatus depicted in FIG. 1.
FIG. 2B is an end view of the retainer ring element seen in FIG. 2A.

Attention is invited to FIG. 1, showing one embodiment of the apparatus of the invention. The turbine 10 features a turbine housing 12 that is manufactured generally in accordance with the known art, except as further explained hereinafter. The turbine housing 12 substantially surrounds and defines a turbine bore 14 for receiving a turbine wheel (not shown in FIG. 1) rotatable upon a turbine shaft according generally to convention. In one possible embodiment, the inlet side of the housing 12 may be provided with a port 16 permitting the placement of the turbine wheel into the bore 14 during turbine assembly. After the installation of the turbine wheel, the port 16 is closed and secured by, for example, the bolted attachment of a turbocharger center housing rotating assembly (not shown).

With continued reference to FIG. 1, it is noted that the turbine housing 12 features and defines a turbine tip diameter $D_{TIP}$ that ordinarily corresponds approximately to the maximum tip diameter of the turbine wheel, according with known art. Also defined is the turbine housing trim diameter $D_{TRIM}$ which varies among different turbine housing models, but corresponds generally to a functional diameter of the turbine wheel, there being a very close clearance between the circumference of the wheel and the housing trim wall 17 defining the trim diameter $D_{TRIM}$. In some embodiments of the present invention, the turbine tip diameter $D_{TIP}$ may be only slightly larger than the trim diameter $D_{TRIM}$.

"Downstream" within the bore 12 is the turbine diffuser or exducer 18, a conduit via which gas is exhausted from the turbine assembly. The diameter $D_{EX}$ is important in making an appropriate mechanical joint for the coupling and size required for the exhaust system. Notably, the invention has practical use in turbines employing generally cylindrical exducers, such as depicted in FIGS. 1, 4, 5, 6, and 8, as well as turbines having flared or conical exducers, such as those seen in FIGS. 3 and 7.

Implementation of turbine efficiency tailoring is accomplished by, among other things, affecting the gas flow into and through the exducer 18. Referring to FIG. 1, this may be achieved by the provision of a "step" in the bore 14, whereby the diameter of the exducer 18 is abruptly reduced for an abbreviated portion of its axial length. For example, in the embodiment of FIG. 1, there is provided a separately produced step bore ring 20 that is insertable through the exducer 18 and into the bore 14. As seen in FIGS. 2A and 2B, the step bore ring 20 is a rigid annulus having an exterior diameter substantially equal to the exducer diameter $D_{EX}$ so as to be snuggly received into the throat of the exducer 18, concentrically about the axis of the bore 14, as seen in FIG. 1. The step bore ring 20 may be there fixed in position by threaded bolts 21 or other suitable fastening means or integrated into the casting of the turbine housing.

Notably, the step bore ring 20 defines an aperture 22 therein, preferably concentric with the ring's outer circumference, having a selected tailored diameter d (FIGS. 2A and 2B). Tailored diameter d is preferably and nearly always less than the exducer diameter $D_{EX}$, and is smaller than the turbine housing trim diameter $D_{TRIM}$. The step defined in the bore 14 by the step bore ring 20 thus is configured so that the normal smooth flow of the gas exiting the turbine wheel is disturbed, by constricted passage through the aperture 22 of the ring 20, near the turbine wheel exit. The tailored diameter d is between about 80 percent and 100 percent of the $D_{TRIM}$. The precise ratio between d and $D_{TRIM}$ is selected and determined to obtain the desired tailoring. The ratio between the tailored diameter d and the housing trim diameter $D_{TRIM}$ affects the turbine efficiency characteristic. The performance tailoring of the turbine stage is associated with the impact of the downstream orifice tailored diameter d on $D_{TRIM}$ (in FIG. 1, for example).

Figure 9:
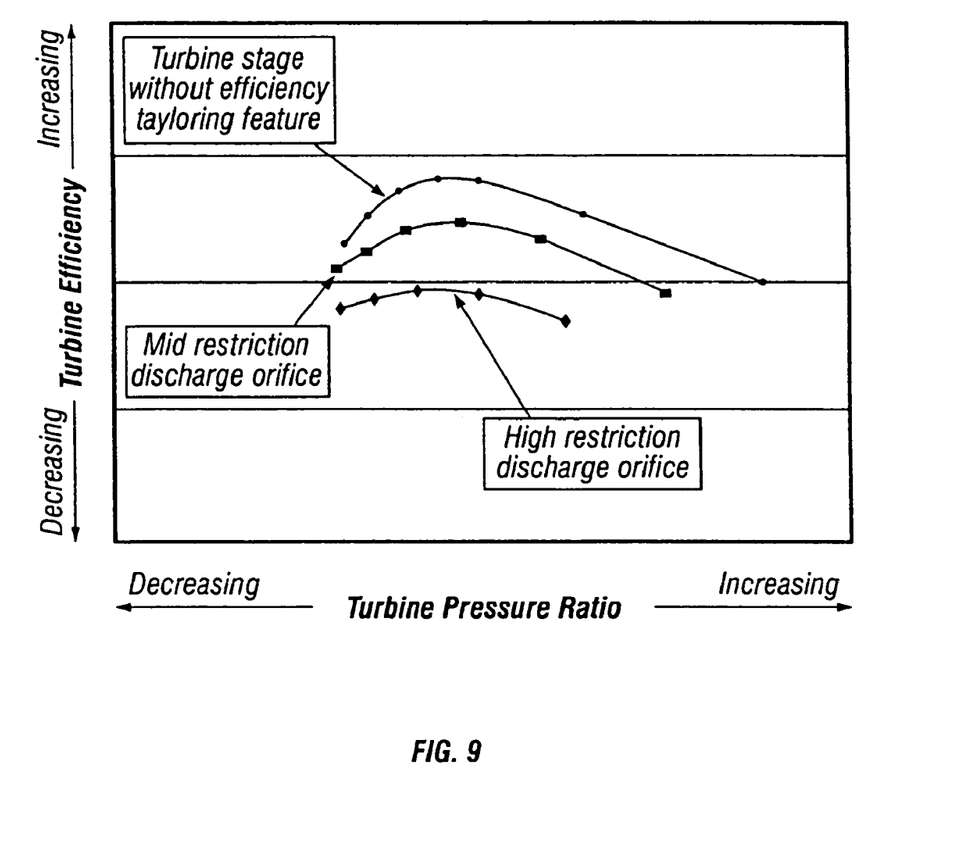
FIG. 9 is a graph depicting relative impact of sizing of a fixed configuration tailored diameter, according to the present invention, with respect to a fixed trim diameter in terms of turbine pressure ratio and turbine efficiency.

The "step bore" resulting from the aperture 22 can be tailored such that the turbine efficiency can be matched to provide a similar efficiency characteristic to that which is desirable for VNT brand turbocharger EGR systems FIG. 9 is a graph showing relative impact of sizing of a fixed configuration d diameter with respect to a fixed trim diameter in terms of turbine pressure ratio and turbine efficiency. Modulating turbine efficiency via fixed d diameter sizing for a VNT turbine stage is a means by which turbomachinery speed can be modified or matched to meet a specific set of engine conditions. The efficiency impact of the orifice diameter varies with size and operating pressure ratio. Performance characteristics of various configuration d diameter shapes will be variable based on the basic shape of the orifice.

Figure 3:
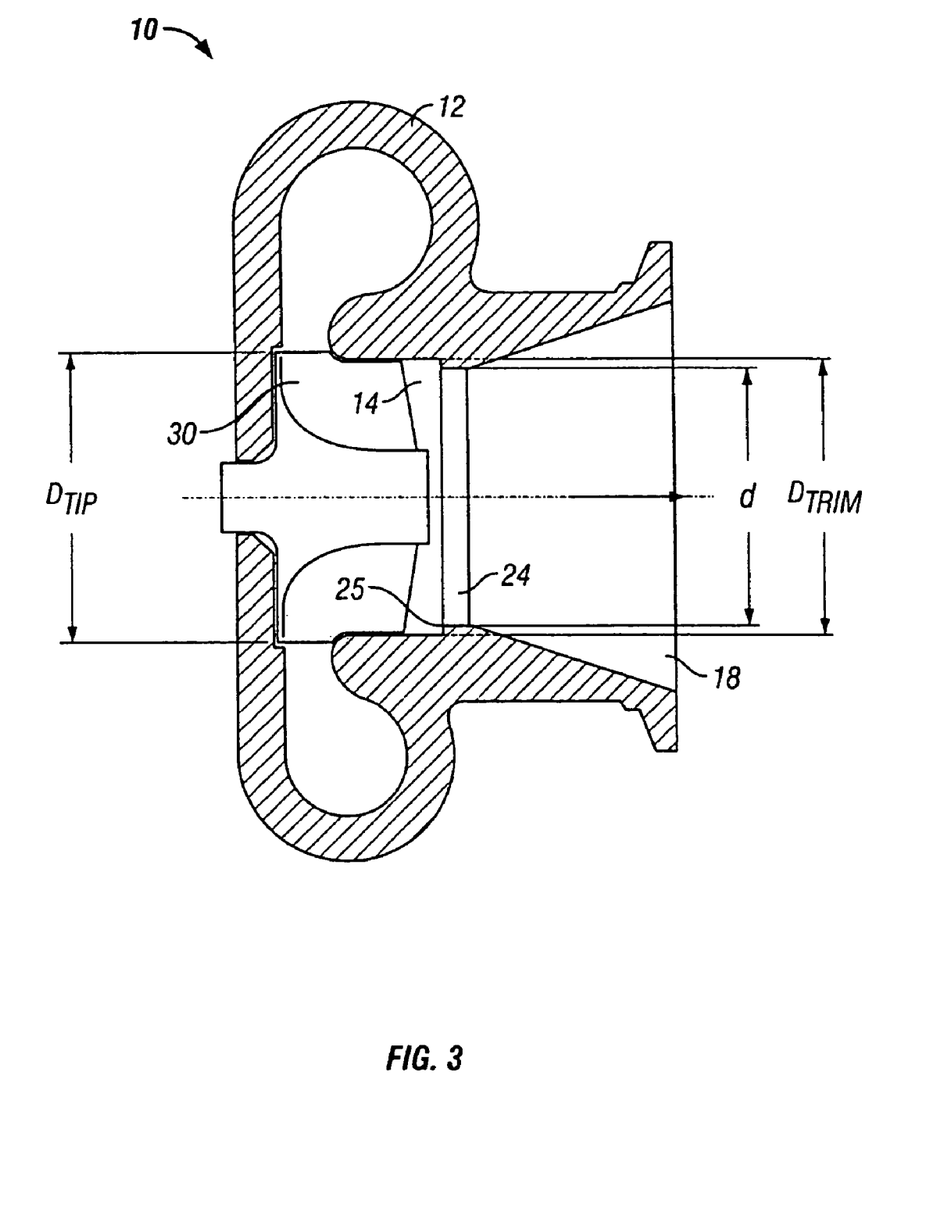
FIG. 3 is a side sectional view of another embodiment of the apparatus according to the present invention, showing a retainer ring integrally cast with the turbine housing.

Reference is made to FIG. 3, illustrating a preferred embodiment of the invention. The embodiment of FIG. 3 is very similar in many respects to the embodiment of FIG. 1, except that the step bore ring 24 is cast in place integrally with the housing 12. A turbine wheel 30 is shown mounted in the turbine bore 14. In this "fixed geometry" embodiment of the invention, a ring 24 cast integrally with the housing 12 provides the step 25 in the bore. The ring 24 thus is a permanent extension of the cast housing, and is integrally associated therewith at the time of housing manufacture. This cast feature is generally annular, but molded within the housing bore 14 as shown in the figure. The circular aperture in cast ring 24 defines the tailored diameter d. It is noted in FIG. 3 that the exducer 18 is not cylindrical, but is a conical diffuser with an ever-increasing exducer diameter proceeding toward the turbine exhaust. The addition of the conical diffuser assists in fine-tuning the tailoring of the turbine performance.

In the embodiment of FIG. 3, the bore step feature is provided by the ring 24 preferably cast integrally with the housing 12. Alternatively, the retainer ring 24 may be manufactured separately, and then inserted into and secured within the turbine bore 14, as suggested by FIGS. 1, 2A and 2B, and 4. The bore step 25 is defined by the edge of the aperture in the ring 24, which aperture has diameter d. The diameter d is the tailored diameter selected for turbine efficiency, and in any event is less than the trim diameter $D_{TRIM}$. The turbine gases, of course, flow through the aperture in the ring 24, but the aperture is too small to admit passage of the turbine wheel 30.

Figure 4:
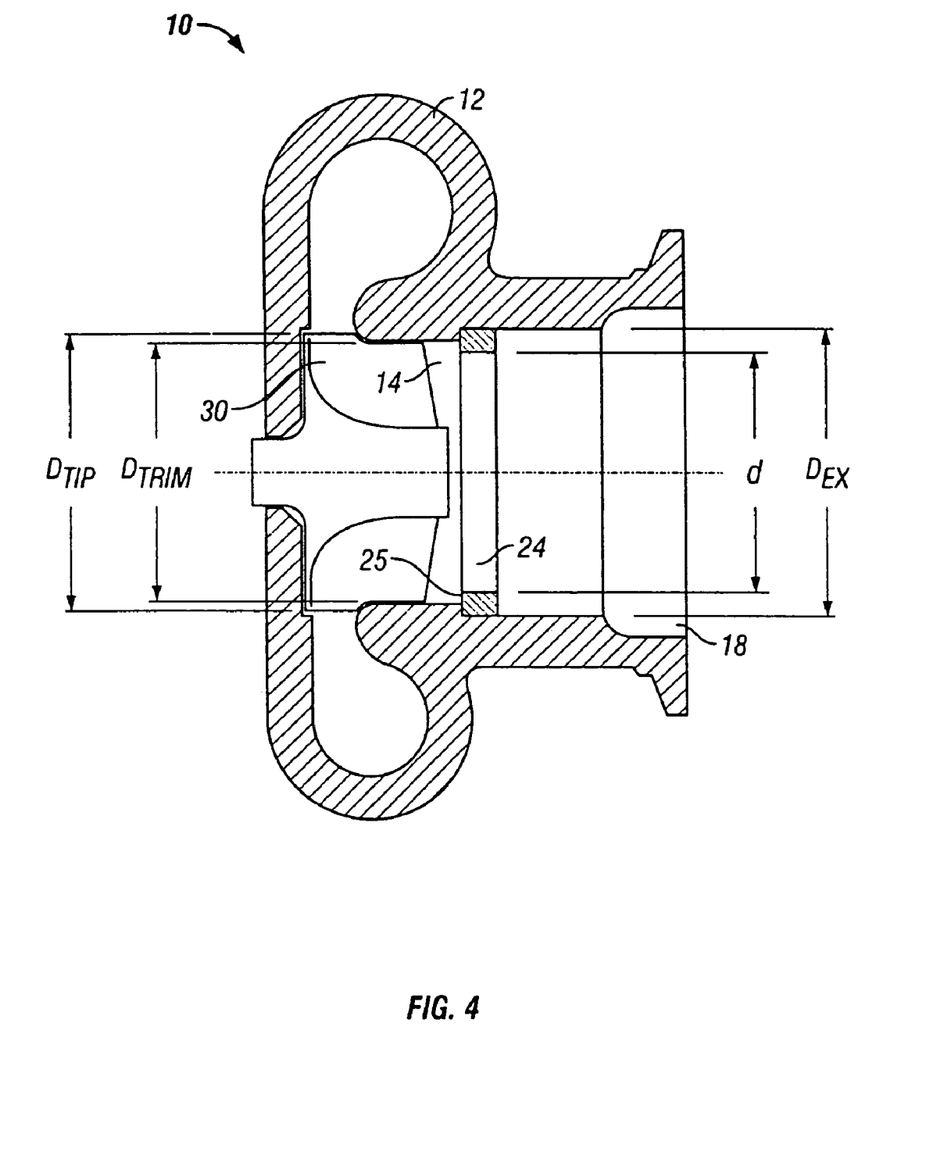
FIG. 4 is a side sectional view of another embodiment of the apparatus according to the present invention, showing a removably insertable retainer ring.
Figure 5:
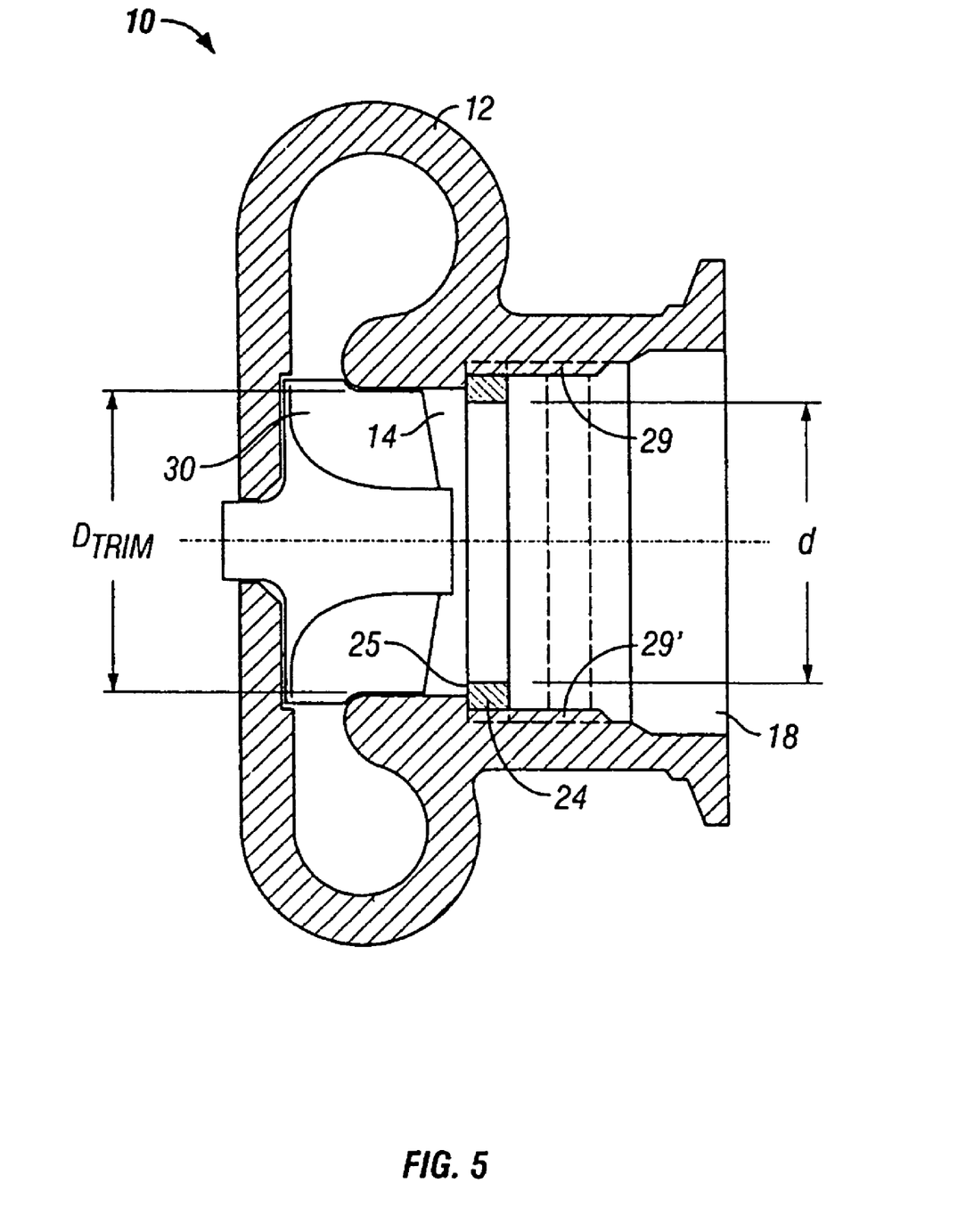
FIG. 5 is a side sectional view of another alternative embodiment of the present invention, showing a retainer ring that is movable axially within the housing and securable at differing positions.

FIG. 5 illustrates how an insertable retainer ring 24, similar to the embodiment seen in FIG. 4, may offer apparatus adaptability. An insertable ring 24 may be disposed within the turbine bore and secured at one or more different axial locations. FIG. 5 shows the retainer ring 24 secured (for example with bolts directed radially through the ring and into the housing) at an axially forward position. However, since the retainer ring 24 is removably insertable, its axial position also is selectively adjustable. As suggested by the phantom lines in FIG. 5, the retainer ring can be disengaged from an axially forward position, slipped to any second, rearward, location, and there again temporarily fixed in place. This adjustment, which may be incrementally or infinitely variable depending upon the mode of connecting the ring 24 to the housing, permits the retainment and tailoring features of a single turbine apparatus 10 to be customized to particular uses. By this adjustability of the ring location, the axial position, and effect, of the reduced tailored diameter d defined by the ring can be regulated and selected for optimum turbine efficiency. The location of the retainer step 25 likewise is adjustable (e.g., to accommodate a turbine wheel 30 of different axial length).

The axial movement of the ring may be guided by two or more circumferentially arrayed longitudinal guides 29, 29', which may be integral extensions of the housing 12 protruding from the turbine bore walls. Guides 29, 29' also prevent radial shifting of the ring 24 about the central axis of the apparatus. Removably insertable retainer rings 24 can be removed and re-installed for maintenance or replacement.

Figure 6:
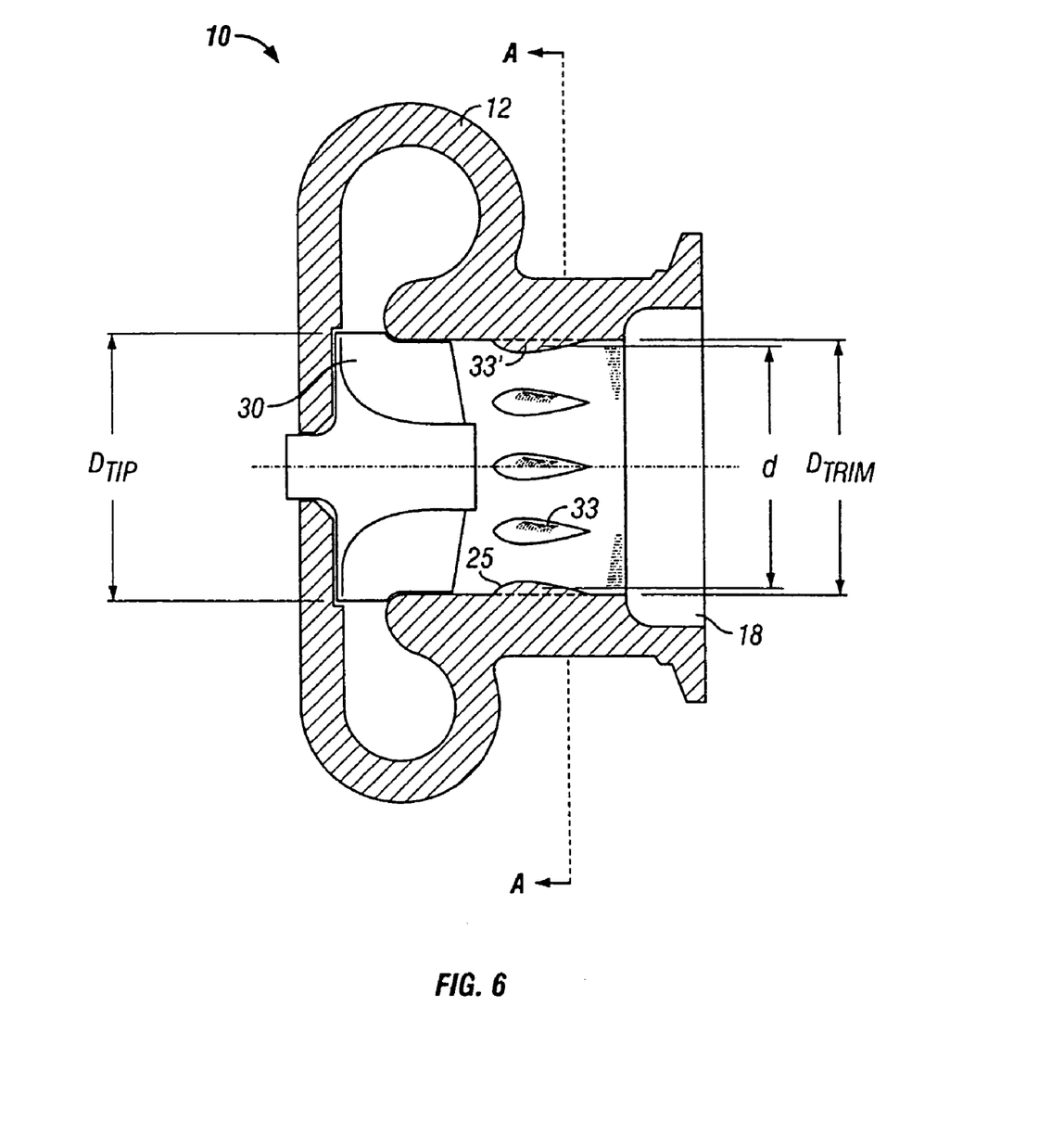
FIG. 6 is a side sectional view of yet another alternative embodiment of the present invention showing a retainer ring that is integrally cast with the turbine housing, and having aerodynamic protrusions extending radially inward.
Figure 6A:
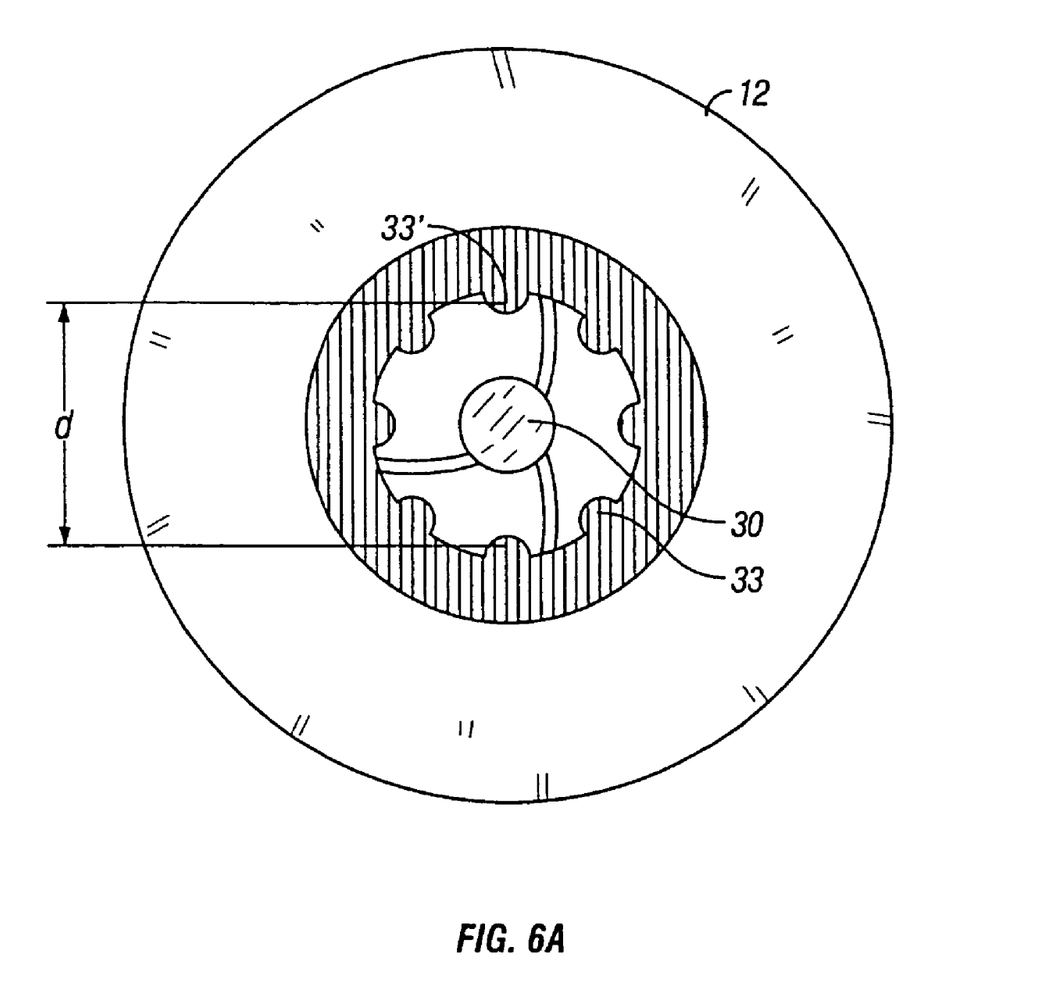
FIG. 6A is an end (radial) sectional view of the apparatus seen in FIG. 6, the section taken along line A—A in FIG. 6.

Still another alternative embodiment of the invention is shown in FIGS. 6 and 6A. Retainer and tailoring advantages are provided by a plurality of profiled protrusions 33, 33' cast integrally with the housing 12. The profiled protrusions could be variably rotated about an axis resulting in a variable tailoring of the turbine efficiency. The radial array of convex protrusions 33, 33' extend radially inward into the throat of the bore 14, and preferably are uniformly spaced around the bore's circumferential perimeter, as seen in FIG. 6A. As indicated in the figures, especially FIG. 6A, effective tailored diameter d is defined approximately by the average "height" of diametrically opposite protrusions. The protrusions 33, 33' may have any of a variety of profiles or shapes. One preferred profile is depicted in FIGS. 6 and 6A, where each protrusion has a somewhat oval or "tear drop" footprint and an airfoil axial profile. Any of wide variety of shapes and profiles are suitable to the function of the invention, although smooth, aerodynamic profiles such as those seen in the figures are preferred.

Figure 7:
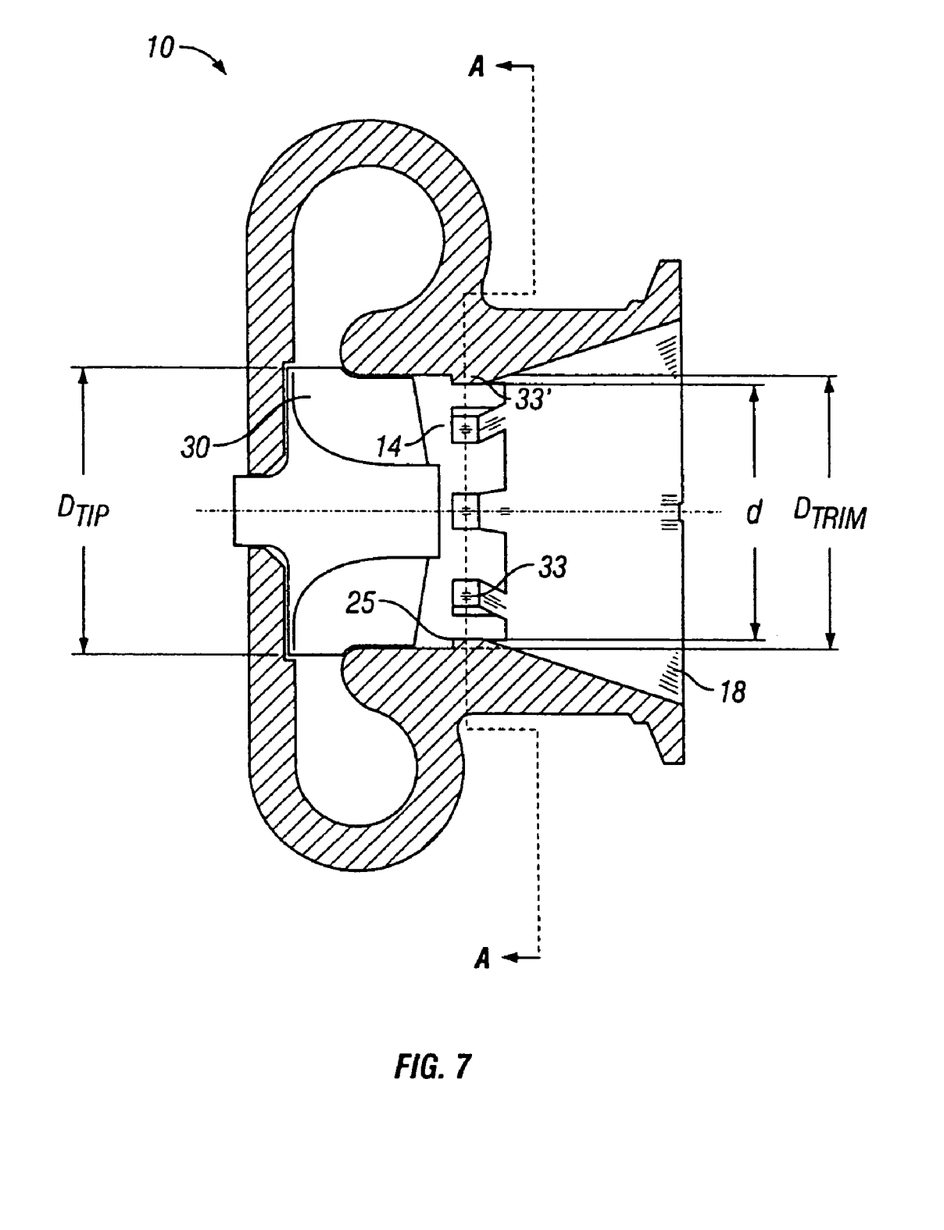
FIG. 7 is a side sectional view of yet another alternative embodiment of the present invention showing a retainer ring that is integrally cast with the turbine housing, and having rectilinear protrusions extending radially inward.
Figure 7A:
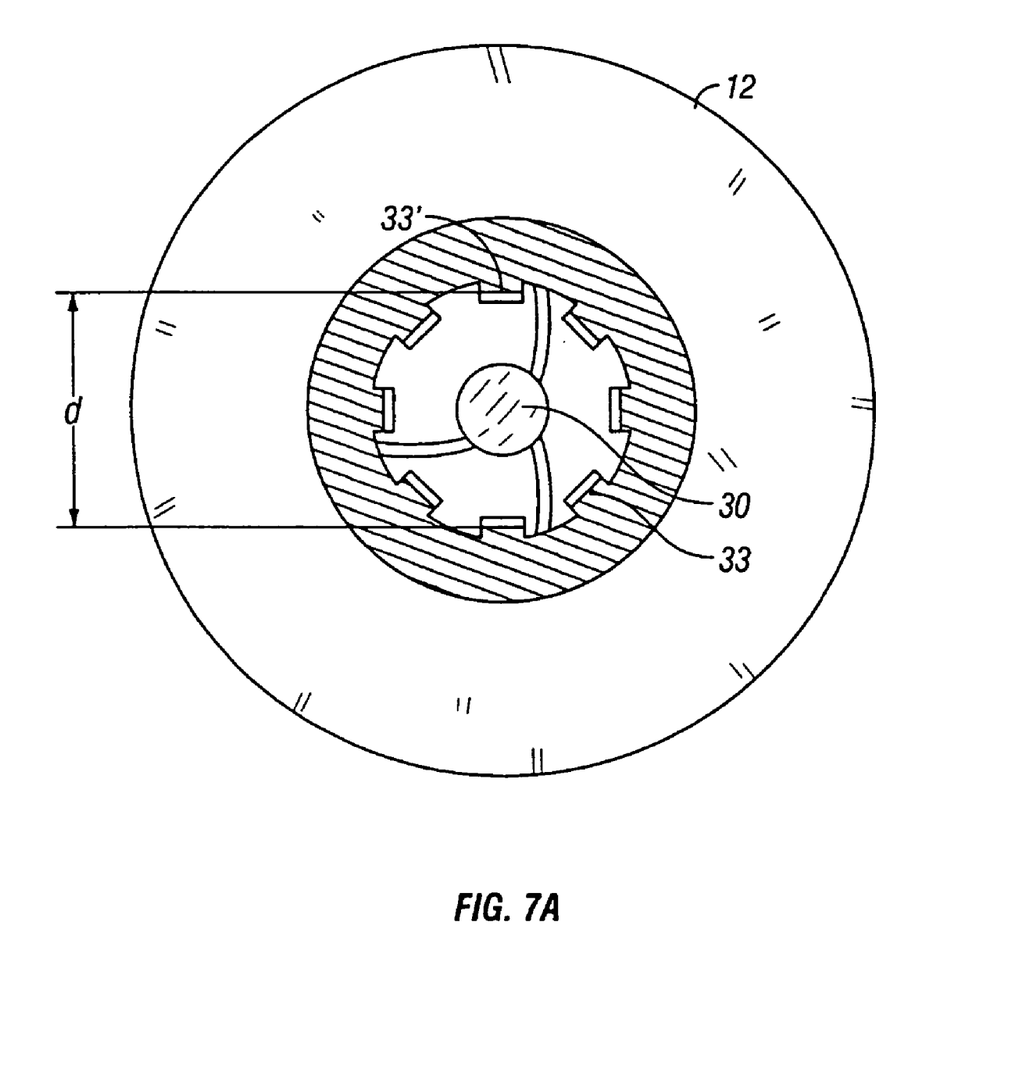
FIG. 7A is an end (radial) sectional view of the apparatus seen in FIG. 7, the section taken along line A—A in FIG. 7.

Alternatively, the protrusions 33, 33' may be more rectilinear or vane-like in form than those shown. FIGS. 7 and 7A depict an alternative embodiment with a plurality of uniformly spaced rectilinear protrusions 33, 33' (eight protrusions in the embodiment of FIGS. 7 and 7A.) As seen in the figures, the protrusions may have, for example, a low axial profile, each protrusion 33 featuring a quadrilateral axial section with a leading "face" perpendicular to the turbine axis, and a trailing face defined by an acute angle that allows the trailing face to merge smoothly into the inside wall of the exducer 18. Again, the effective tailored diameter d is determined using the approximate average radial extension of the protrusions.

In any embodiment featuring an arrayed plurality of protrusions 33, 33', the longitudinal axes of the protrusions, while preferably being mutually parallel, may be canted or angled in relation to the axis of the turbine, to foster "de-swirling" of the exhaust gas as it exits the turbine wheel 30. The number of protrusions 33, 33' also is selectable, and may number, for example, between three and eight (eight in the embodiments of FIGS. 6 and 7).

Figure 8:
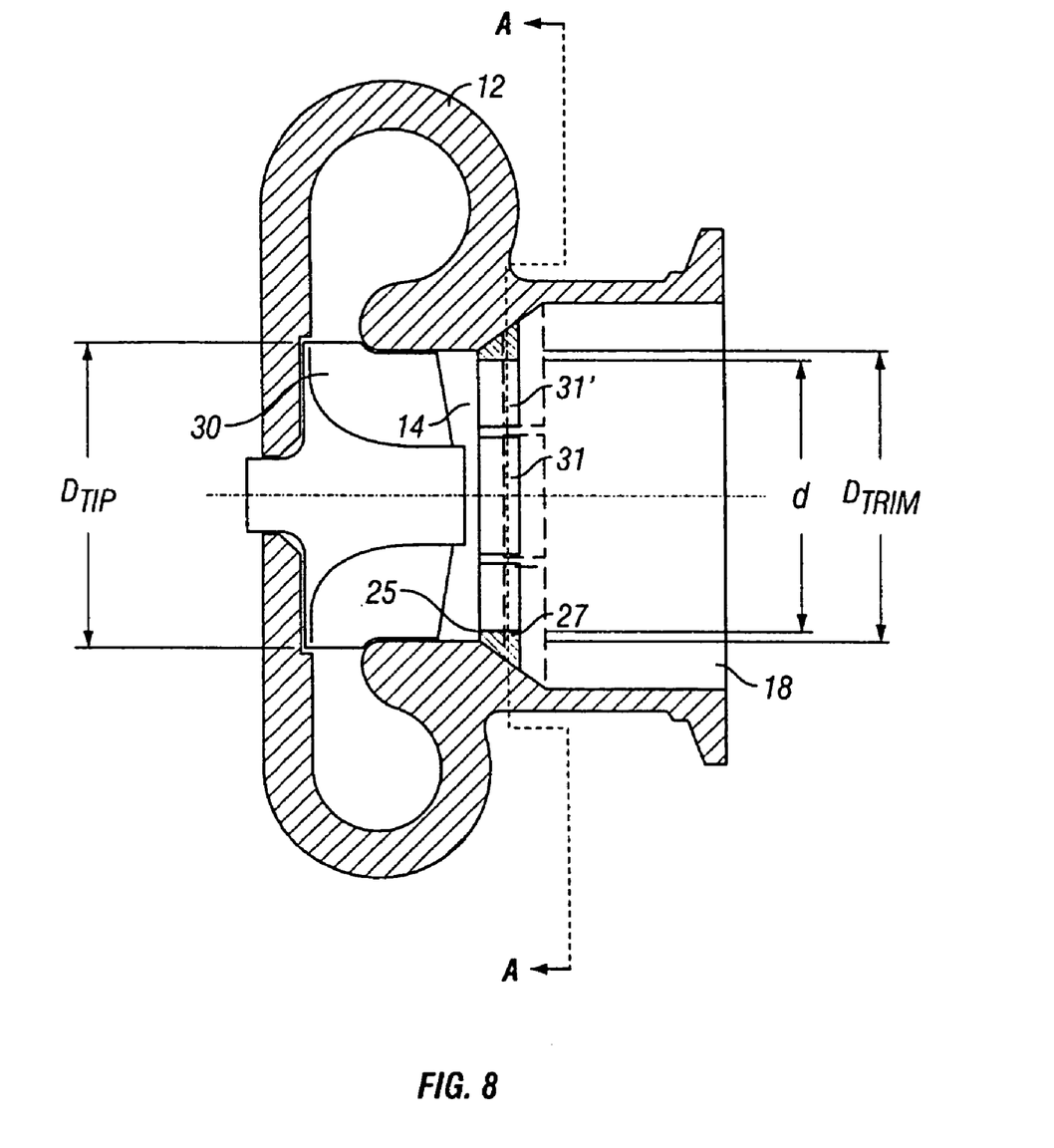
FIG. 8 is a side sectional view of yet another alternative embodiment of the apparatus of the present invention, showing a retainer ring that is adjustable in radial diameter as well as having a selectively adjustable axial position within the turbine housing.
Figure 8A:
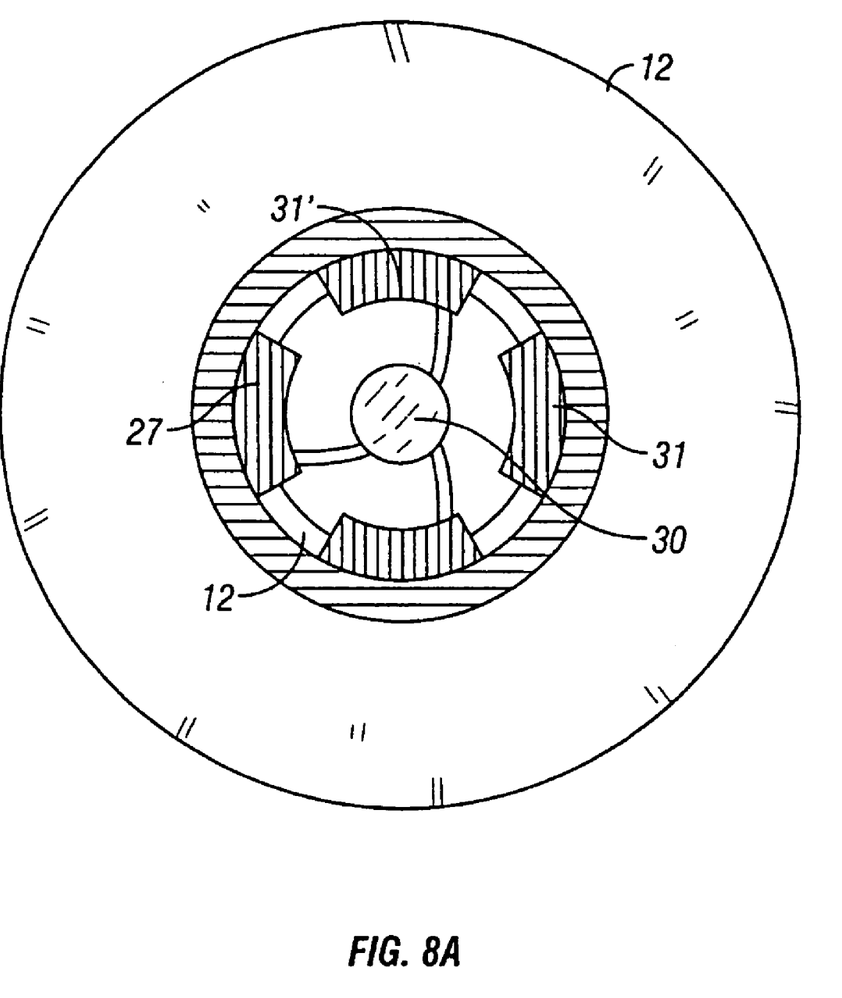
FIG. 8A is an end (radial) sectional view of the apparatus seen in FIG. 8, the section taken along line A—A in FIG. 8.

Yet another embodiment of the invention is shown in FIGS. 8 and 8A. This embodiment of the invention permits the use of an adjustable bore step within a conical, as opposed to cylindrical, exducer. In this embodiment, a segmented ring 27 has a variable diameter, so as to expand or contract according to need corresponding to the oblique annular face of the conical exducer 18. The ring segments 31, 31' can vary in number, the plurality numbering at least three (four shown in FIGS. 8 and 8A) and up, for example, eight or ten.

The embodiment of FIGS. 8 and 8A thus shares some of the features and advantages of the embodiments seen in FIG. 5, except that in addition to being selectively adjustable in axial position within the housing 12, the effective diameter of the step ring 27 can be adjusted, as can the effective tailored diameter d defined by the aperture in the ring 27. To increase the tailored diameter d, the uniformly spaced segments 31, 31' are shifted radially outward, thus increasing the size of circumferential gaps that separate adjacent segments. Likewise, when the ring 27 is moved to a forward position in the exducer, the diameter d is reduced by reducing the gaps between adjacent segments of the ring 27.

The ring segments 31, 31' manifest wedge-shaped longitudinal profiles, as seen in FIG. 8A, and thus can shift simultaneously axially and radially by riding along the annular chamfer 35 in the bore. The ring segments are arrayed so as to always define a segmented annulus, and secured at one or more different axial locations. FIG. 8 shows the segments of the retainer ring 27 secured (for example with bolts directed radially through the ring and into the housing) at an axially forward position. However, since the retainer ring 27 is movably insertable, its axial position also is selectively adjustable. As suggested by the phantom lines in FIG. 8, the retainer ring 27 can be disengaged from an axially forward position, slipped to any second, rearward, location, and there again temporarily fixed in place. Due to the changed diameter of the exducer 18 in which the ring 27 is disposed, the ring 27 tailored diameter d likewise is modified. This adjustment permits the retainment and tailoring features of a single turbine apparatus 10 to be customized to particular uses. By this adjustability of the ring location, the axial position and size, and effect, of the reduced tailored diameter d defined by the ring can be regulated and selected for optimum turbine efficiency. The location of the retainer step 25 likewise is adjustable (e.g., to accommodate a turbine wheel 30 of different axial length).

As with the embodiment of FIG. 5, the axial movement of the ring 27 may be guided by two or more circumferentially arrayed longitudinal guides (not shown in FIG. 8) which may be integral extensions of the housing 12 protruding from the turbine bore walls.

The apparatus of the invention provides, therefore, a step bore 25 in all embodiments that serves to retain the turbine wheel 30 against improper displacement toward the rear of the turbine housing 12. The retainer, typically an annular ring with or without customized protrusions, permits a tailored diameter d in relation to the trim diameter $T_{TRIM}$ to optimize the turbine efficiency characteristic.

By designing, shaping and sizing a "step bore" in the turbine housing, near the turbine wheel exit, the turbine efficiency characteristic can be modified or tailored, resulting in a turbine efficiency behavior which is more favorable to the performance of the variable nozzle turbine turbocharger EGR system according to the present invention. In effect, the step bore 25 reduces the turbine efficiency, which results in an increased turbine inlet pressure, which promotes the flow of exhaust gas from the engine's exhaust manifold into the engine intake manifold. This behavior is accomplished at a lower turbocharger speed than would be achievable with an ordinary turbomachinery turbine efficiency characteristic.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A turbine housing comprising a bore having an axis extending from a turbine wheel end to an exhaust outlet end wherein the bore comprises a trim diameter substantially coaxial with the axis that transitions to a retainer diameter along the axis in the direction of the exhaust outlet end, wherein the trim diameter exceeds the retainer diameter and wherein a first component of the housing defines the trim diameter and a second component of the housing defines the retainer diameter.

2. The turbine housing of claim 1 wherein the retainer diameter transitions to a larger diameter along the axis in the direction of the exhaust outlet end.

3. The turbine housing of claim 1 further comprising a conical diffuser positioned along the axis between the retainer diameter and the exhaust outlet end wherein the opening defined by the conical diffuser increases in cross-section toward the exhaust outlet end.

4. The turbine housing of claim 1 wherein the second component comprises a securable component, securable to another component of the turbine housing.

5. The turbine housing of claim 1 further comprising a turbine wheel substantially coaxial with the axis of the turbine housing wherein the turbine wheel comprises an outer diameter that exceeds the retainer diameter.

6. The turbine housing of claim 5 further comprising a turbine wheel shaft operably connected with a compressor wheel shaft.

7. A method comprising:
restricting flow of exhaust from an internal combustion engine, via a reduced cross-section flow path area of a turbine housing, prior to the exhaust exiting an exhaust outlet of the turbine housing and after extracting energy from the exhaust using a turbine wheel and the turbine housing wherein an outer diameter of the turbine wheel exceeds a dimension of the reduced cross-section flow path area, wherein the restricting comprises tailoring turbine efficiency and wherein the restricting increases pressure of the exhaust at an exhaust inlet of the turbine housing; and
selectively allowing flow of exhaust to an air intake of the internal combustion engine downstream a compressor operatively coupled to the turbine wheel wherein the restricting facilitates the flow of exhaust to the air intake.

8. The method of claim 7 wherein the allowing comprises opening a valve for exhaust recirculation.

9. The method of claim 7 wherein the dimension of the reduced cross-section flow path area comprises a diameter.

10. The method of claim 7 wherein the restricting acts to retain the turbine wheel in the turbine housing upon separation of the turbine wheel from a turbine wheel shaft during operation.

11. The method of claim 7 wherein the restricting acts to reduce energy of the turbine wheel upon separation of the turbine wheel from a turbine wheel shaft during operation.

* * * * *